(12) United States Patent
Wallach

(10) Patent No.: US 6,782,740 B2
(45) Date of Patent: Aug. 31, 2004

(54) TIRE PRESSURE INDICATION SYSTEM

(76) Inventor: Mark K. Wallach, 101 Gedney, Nyack-on-the-Hudson, NY (US) 10960

( * ) Notice: Subject to any disclaimer, the term of this patent is extended or adjusted under 35 U.S.C. 154(b) by 0 days.

(21) Appl. No.: 09/978,377

(22) Filed: Oct. 16, 2001

(65) Prior Publication Data

US 2002/0050164 A1 May 2, 2002

Related U.S. Application Data

(60) Provisional application No. 60/244,395, filed on Oct. 30, 2000.

(51) Int. Cl.[7] .................. G01M 17/02; B60C 23/02; B62H 5/20
(52) U.S. Cl. .................. 73/146; 73/146.2; 73/146.3; 73/146.8; 116/34 R; 340/442
(58) Field of Search ................ 73/146–146.8; 116/34; 340/448, 442, 445; 137/224; 301/37.11; 152/517, 524, 555

(56) References Cited

U.S. PATENT DOCUMENTS

| | | | | |
|---|---|---|---|---|
| 3,756,190 A | * | 9/1973 | Kendall | 116/34 R |
| 3,915,502 A | * | 10/1975 | Connell | 301/37 |
| 4,353,322 A | * | 10/1982 | Weglin et al. | 116/34 B |
| 4,384,482 A | * | 5/1983 | Snyder | 73/146.5 |
| 4,646,673 A | * | 3/1987 | Fordyce | 116/34 |
| 4,953,395 A | | 9/1990 | Jard | |
| 5,770,797 A | | 6/1998 | Lapohn | |
| 5,922,152 A | * | 7/1999 | Patti | 152/427 |
| 2002/0139288 A1 | * | 10/2002 | Evans et al. | 116/34 |
| 2003/0024463 A1 | * | 2/2003 | Evans et al. | 116/34 |

* cited by examiner

Primary Examiner—Charles H. Nolan, Jr.
Assistant Examiner—Marissa Ferguson
(74) Attorney, Agent, or Firm—Honigman Miller Schwartz and Cohn LLP

(57) ABSTRACT

A tire pressure indication system for a single or dual wheel tire assembly includes a pair of analog/digital readout pressure gauges and associated valve stems for individually monitoring and pressurizing the tire or tires of the wheel assembly. The tire pressure indication system may be attached to the outside wheel of the dual wheel assembly by a bracket structure mounted to the outside wheel with an adhesive tape or other suitable fastener. The tire pressure indication system provides for a tire pressure indication system that can be easily mounted to the wheel tire assembly without the use of a hubcap or other similar mounting structure.

15 Claims, 3 Drawing Sheets

TIRE PRESSURE INDICATION SYSTEM

CLAIM OF PRIORITY

This application claims priority to U.S. Provisional Patent Application Serial No. 60/244,395, filed Oct. 30, 2000, the entire contents of which are incorporated herein by reference.

BACKGROUND OF THE INVENTION

1. Field of the Invention

The present invention relates to tire pressure indicating systems in general, and more particularly to such systems offering digital and analog tire pressure indicators and easy access tire fill valves for single and dual wheel tire assemblies.

2. Description of the Related Art

Fuel and tires represent the greatest operating cost for a single tractor/trailer or an entire fleet. If a truck tire that normally operates at 100 psi is 25–30% under inflated, which causes excessive tread wear due to heat and friction and reduces fuel efficiency due to resistance and drag. At today's average cost of $200–$300 per tire, under inflation could account for as much as $75 per tire in tire costs alone. Under inflation also negatively impacts the longevity of tire casings. Proper air maintenance assures that tires can be recapped up to five times.

Prior art methods and devices for maintaining proper tire pressure include pressure gauges that are carried by the driver and which are used to periodically check the tire pressure and to fill the tires to proper levels. It is also known to use tire gauges or indicators, which are permanently mounted to the tire valve stem to provide a readout of the tire pressure when viewed by the truck operator.

Truck drivers most commonly use the manual pressure gauges to check tire inflation pressure usually after first tapping the tire with their foot or tool and finding that it was low. Such a check detects a low tire only after a significant loss of tire pressure. On a slow leak, the tire has been operating at low pressure for some time and some tire degradation has already occurred. Also, over pressure is not detectable by such tapping of the tire.

Permanently mounted tire gauges and indicators on the tire valve stem adjacent the rim are small in size and require the operator to bend down to the tire level before the operator can see the gauge pressure reading. Some gauges mounted away from the rim tire valve are actually covered with a cover and required an effort on the part of the operator to remove the cover before checking the gauges. No known permanently mounted tire pressure maintenance systems offer an easily seen gauge which can be easily viewed by the truck operator as the operator walks by the wheels of a stationary vehicle to see if the inflation pressure is in the proper range (neither under inflated nor over inflated).

One known specific example is the permanently mounted tire inflation indicator is found in U.S. Pat. No. 3,958,526. An under inflation type warning system is disclosed where a collapsible bladder mounted axially on the wheel is connected to a tire and is inflated whenever the tire pressure falls below a predetermined level. However, there is no warning provided by this system for a slowly leaking tire or for over inflation. There is no easily seen gauge which will show the pressure in the tire at all times and will guide the operator in inflating the tire to the proper level. The system uses the conventional tire fill valves.

Another example may be found in U.S. Pat. No. 4,387,931. Here a pressurized container regulated to the desired tire pressure is continuously connected to all of the tires to thus maintain them all at the proper pressure level. However, this system provides no actual gauge readings of tire pressure and a failure of the pressure regulator or the container could result in an undetected over pressurized or under pressurized condition in all of the tires. There are no conventional tire fill valves used.

A dual-tire, wheel assembly tire pressure indicating system is disclosed in U.S. Pat. No. 4,953,395. The gauge or gauges are located in the center hub of the wheel and hence are covered with a removable cover requiring the operator to bend down to wheel level to uncover and view the gauges. Further, there is no indication that the gauges offer any area markings thereon to indicate proper or improper inflation along with an analog pressure readout thereon to aid tire inflation to the optimal tire pressure of 100 psi., nor is there any logo identifying which gauge is for the front and which for the back tire of the dual wheel assembly.

Another conventional dual-tire, wheel assembly tire pressure indicating system is disclosed in U.S. Pat. No. 5,770,797. The tire pressure indicating system includes a pair of analog/digital readout pressure gauges mounted on a full wheel streamlined hubcap. The hubcap is mounted to the outside wheel of the dual wheel assembly by a U-shaped bracket connected to the wheel through the wheel bolts with the hubcap connected thereto by quarter turn fastener assemblies.

However, the inventor of the present invention has recognized that a problem associated with such prior devices is that, in the event the device becomes detached from the valve stem while the automobile is in motion, the device may become a high velocity projectile and thus present a safety hazard.

Another problem recognized by the inventor of such prior devices is that, because of the eccentricity of the load that they add to the tire, the automobile's tire may become unbalanced, thus presenting a safety problem and causing an uneven and unsafe ride for the automobile's passengers.

Another problem of such prior devices recognized by the inventor is that they require the use of a mounting device for the tire pressure gauges, such as a hubcap assembly mountable to the front wheel of a deep dish dual wheel assembly through a bracket assembly connected by wheel bolts or nuts to oppositely located studs of the outside wheel of the dual wheel assembly. Such a tire pressure indication system is disclosed in U.S. Pat. No. 5,770,797 to Lapohn, herein incorporated by reference. This unnecessary practice of providing a tire pressure indication system mounted to a hubcap assembly increases the cost and weight associated with the tire pressure indication system.

SUMMARY OF THE INVENTION

To solve these and other problems, one aspect of this invention is to provide a tire pressure indication system for a tire wheel having an easily visible tire pressure gauge and a tire inflation valve stem mounted proximately thereto.

Another aspect of this invention is to provide a device in which the tire pressure sensing device is attachable to the valve stem of common automobile tires.

Yet another aspect of this invention is to provide a device in which the tire pressure sensing and indicating device may remain attached to the tire's valve stem while the tire is in motion.

Still another aspect of this invention is to provide a device that introduces minimal eccentric loads to the tire.

Yet another aspect of this invention is to provide a device in which the pressure indicating device is either a dial gauge or a digital gauge.

Still yet another aspect of this invention is to provide a device in which the gauge is protected from damage by debris.

Yet another aspect of this invention is to provide a device which can be attached to existing automobile wheels and tires without modification of the wheels or tires.

Another aspect of this invention is to provide a device that can be securely fastened to the rim of a tire and in a manner that prevents theft of the device.

Another aspect of this invention is to provide a tire pressure indicating system for a dual-wheel tire assembly having a pair of large off-center spaced digital tire pressure gauges whose proper pressure range is easily seen by a truck operator walking by the wheel assembly.

Yet another aspect of this invention is to provide a tire pressure maintenance system for a dual-wheel tire assembly having a pair of off-center spaced tire pressure gauges with associated tire fill valve stems located proximate to each gauge to allow the monitored inflation of the tire monitored by the associated gauge.

According to the invention, a tire pressure indication system comprises a bracket structure mounted to an inside surface of a wheel assembly by use of an adhesive tape, at least one air pressure gauge mounted to the bracket structure; and a pneumatic conduit being in communication with the at least air pressure gauge and a valve stem of a pneumatic tire, wherein the at least one air pressure gauge provides an indication of air pressure of the pneumatic tire to an operator.

Various objects and advantages of this invention will become apparent to those skilled in the art from the following detailed description of the preferred embodiment, when read in light of the accompanying drawings.

DESCRIPTION OF THE PREFERRED EMBODIMENT

Figure 1:
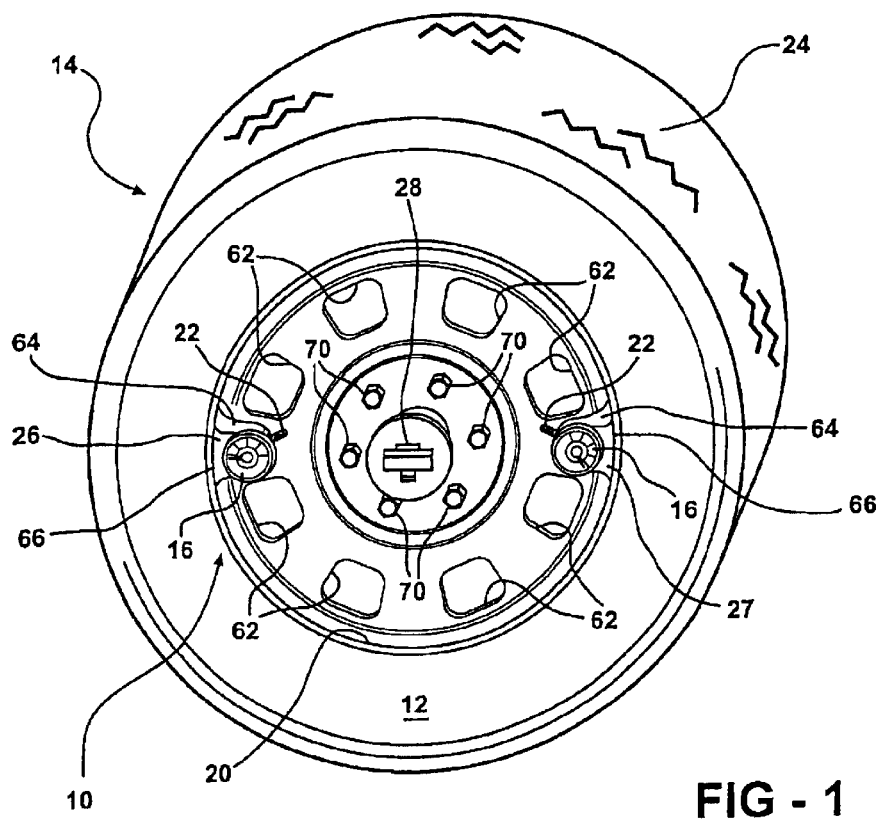
FIG. 1 is a perspective view of the tire pressure maintenance system of the invention mounted to the inside surface of the outside wheel of a dual-wheel tire assembly.

Referring now to the drawings, there is illustrated in FIG. 1 a tire pressure indication system 10 mounted to an outside wheel 12 of a dual tire wheel assembly 14. The tire pressure indication system essentially comprises a pair of Bourdon type tire pressure gauges 16 each mounted to an inside surface 20 of the outside wheel 12 in a manner that will be described below. Assemblies 18 are separately connected to the conventional tire valves stems extending from the rims of the front tire 12 and a rear tire 24 of the dual wheel assembly. The dual wheel assembly comprises two tire wheels assembled back to back. An identifying FRONT and REAR tire logo 26, 27 may be located on the inside surface 20 of the outside wheel 12 proximate the appropriate assembly 18 to easily identify to the truck operator which tire is possibly under or over inflated as shown by the gauge 16 and which associated valve stem 22 should be used to bring the tire inflation to normal. It is very advantageous to the operator to have the gauge 16 monitor the tire pressure change at his eye level as he bends down to either fill or relieve the appropriate tire pressure through the associated valve stem. The gauge 16 has an analog display to aid the operator in filling the tire to the optimal pressure of 100 psi. The logos 26, 27 could be formed as a plate that is riveted to the inside surface 20 of the outside wheel 12 or in any desired conventional manner. Alternatively, the logos 26, 27 could be formed as an adhesive decal or emblem, a logo stamped into the inside surface 20 of the outside wheel 12 or it could be formed integrally in the valve stem assembly if it is plastic molded.

It will be noted that should the dual wheel assembly 14 has an associated odometer 28 that is commercially available as the HUBODOMETER odometer mounted on the axle of the wheel assembly 14. The tire monitoring assemblies 18 being mounted on the inside surface 20 of the outside wheel 12 do not interfere with the central odometer 28 mounting as is the case with certain prior art tire gauge systems. Furthermore, because the mounting assemblies 18 are preferably located on opposite sides of the inside surface 20 of the outside wheel 12 the dynamic balance of the wheel assembly 14 is not upset. More importantly, this opposite side area of the inside surface 20 of the outside wheel 12 allows a relatively large pressure gauge 16 face to be mounted therein whose digital like display of proper or improper tire inflation is easily seen by the truck operator as he walks past the rig to thus view if his tires are properly inflated without having to bend down by each gauge and open doors to view the gauges as in certain described prior art systems.

One aspect of the invention is that the dual wheel assembly 14 may include one or more strip of reflective material 62 can be adhesively attached to the outer surface 20 of the dual wheel assembly 14. The reflective material 62 is designed to provide an adequate amount of reflectivity to prevent accidents caused by a vehicle hitting the side of the truck. The reflective material 62 may be composed of cube corner (micro-prism) retroreflective elements integrally bonded to a flexible, smooth-surfaced tough and weather resistant UV stabilized polymeric film. The prism surfaces can be coated with a vacuum deposition of aluminum to provide a mirror surface to the prism facets. The reflective material 62 should conform to ASTM E810 standards to meet or exceed the requirements of ASTM D4956-90 Type V Sheeting. An example of the reflective material 62 is commercially available as DURABRITE® vehicle marking tape sold by Reflexite Corporation of New Haven, Conn.

Figure 3:
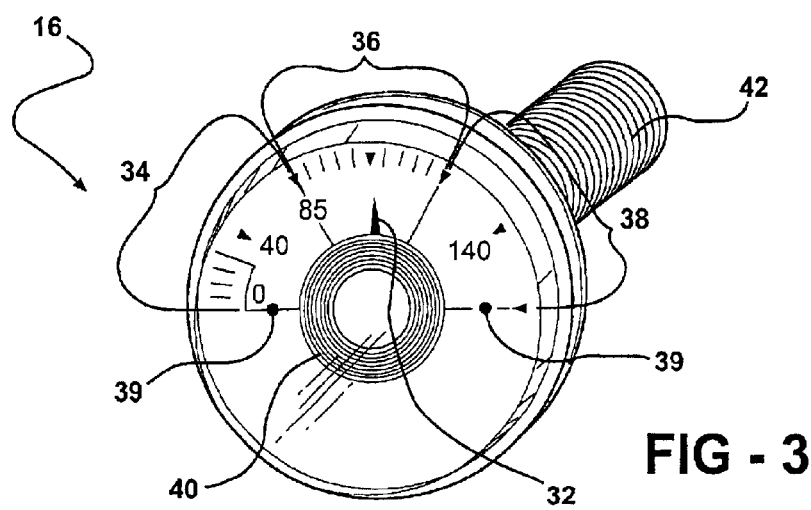
FIG. 3 is a perspective view of the Bourdon tube type tire gauge used in the tire maintenance system shown in FIG. 1.
Figure 4:
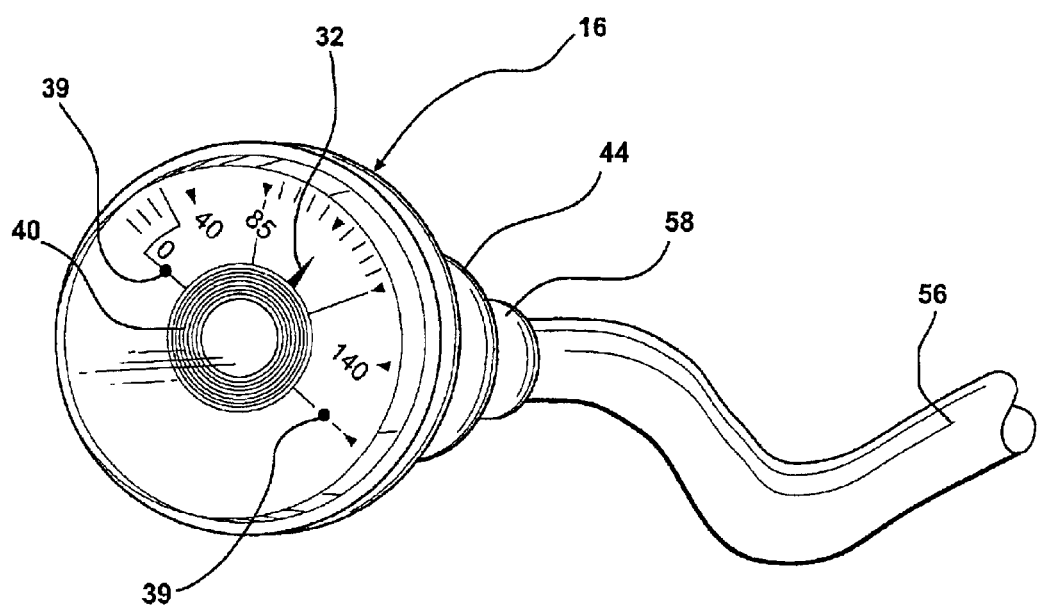
FIG. 4 is a perspective view of the tire fill valve assembly used in the tire maintenance system shown in FIG. 1.

Turning next to FIG. 3, the gauge 16 is a Bourdon tube type pressure gauge having an indicator 32 extending from a spiral spring of the gauge 16. The gauge 16 is calibrated to an analog scale of marked tire pressure from 0–180 psi. Also, the scale is divided into three areas 34, 36, 38 of two different colors to provide a digital indication of safe or unsafe tire pressure inflation thereby. The central area 36 is colored green to indicate an area of proper tire inflation. When the white indicator 32 is in this area a truck operator walking by the tire assembly 14 can easily see this display and determine that his tires are properly inflated. The outer areas 34 and 38 are colored red and the white indicator 32 is easily seen on this background to indicate a tire problem condition of over or under inflation because red is associated with warnings. Thus, these red and green areas provide a two level or digital display of proper or improper tire inflation to the operator without requiring a readout of the actual gauge pressure.

If an improper inflation level is indicated by the digital display, the operator then uses an air hose to fill or relieve the tire through the valve stem 22 associated with the viewed gauge 16 to bring the tire to the proper inflation level. Under these conditions the analog scale of the gauge 16 is used to easily bring the tire not only back to the safe inflation green zone but inflates the tire to the optimal inflation point of 100 psi which is indicated thereon by a white hash mark 40 in the green area 36 having an associated logo of 100 psi next to it. A pair of stop posts 39 may be located on the gauge 16 near each end of the analog scale to prevent the indicator 32 from over extending during high-speed wheel rotation. The gauge 16 has a threaded pressure inlet port 42 which screws into a T-section 44 of the fill valve assembly 18 along the top thereof into an internally threaded section 46 having threads complimentary to the threads of the flexible hoses 54, 56.

It is known that outside tire 12 of a dual wheel assembly 14 has a rim valve stem (not shown) that extends from the rim of the wheel toward the inside wheel of the assembly 14 while the inside wheel 24 has a rim valve stem (not shown) that extends toward the outside wheel. Utilizing these conventional rim valve stems, flexible hoses 54, 56 are used to connect the appropriate outside and inside air tire valve stems 22 and associated gauges 16 to the proper tire valve stems.

Figure 5:
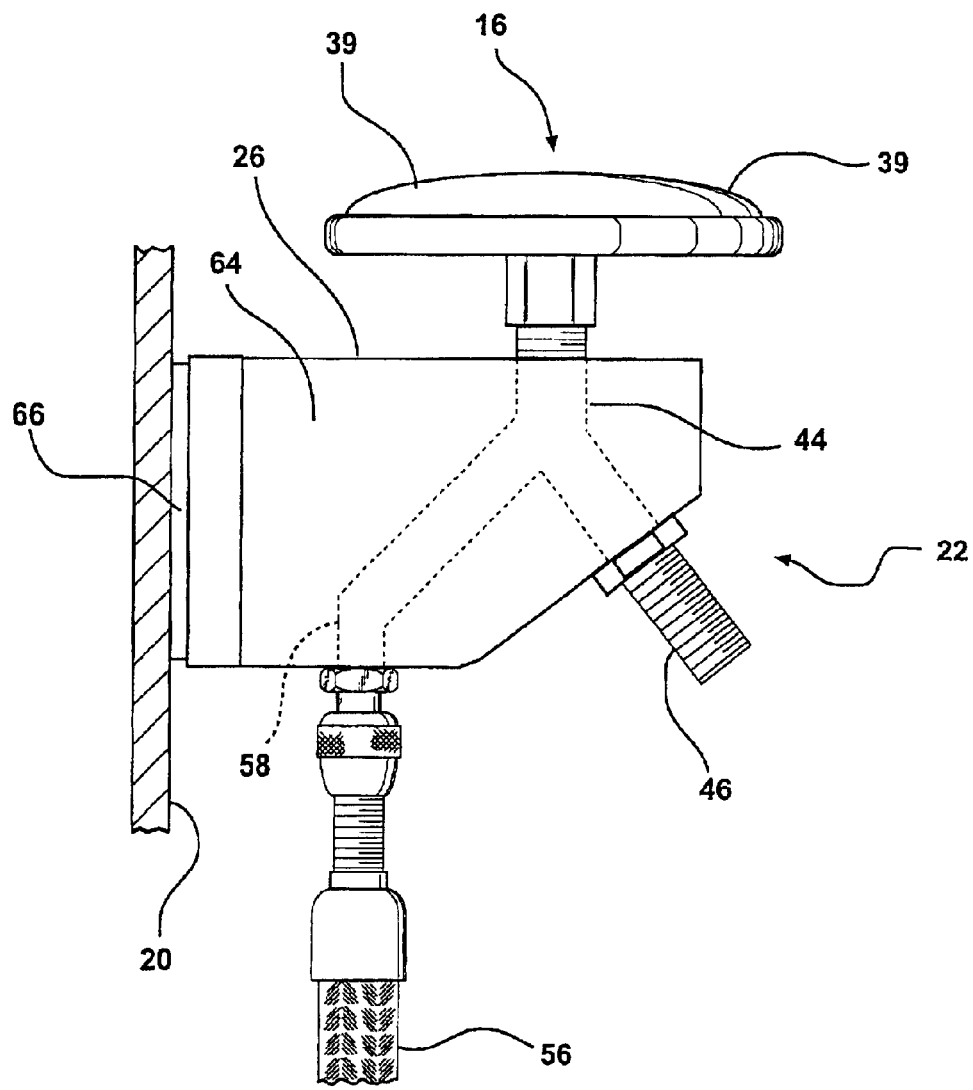
FIG. 5 is an enlarged view of the gauge mounted to the inside surface of the wheel assembly by the use of adhesive tape.

Referring now to FIG. 5, the hoses 54, 56 have threaded stem centered connectors 58 which sealably screw into the bottom of T-section 44 and are long enough to allow the assembly 18 to be removed from the dual wheel assembly 14 a sufficient distance to enable the hoses 56 to be disconnected when necessary. The assembly 18 connected to the FRONT indicating face has a 180° coupling 60 connected to the other end of the flexible hose 54, 56 terminating in a coupling (not shown) for sealably screwing on to a tire valve stem. The gauges 16 are connected to the rim valve stems or extenders thereof by hoses 54, 56 which have a length such that the assembly 18 may be moved outwardly from the wheel to allow it to be laid aside to gain access to the full wheel or to be disconnected from the cover for purposes of removing the wheel for whatever purpose.

For a secure mounting at high speeds or for bumps or potholed roadways, the assembly 18 is preferably not snapped onto the wheel rim, as is the conventional practice, but is mounted to a bracket structure 64 secured to the inside surface 20 of the outside wheel 12 by using fastening means. The fastening means for securing the bracket structure 64 to the inside surface 20 of the outside wheel 12 is preferably a double-coated acrylic foam adhesive tape 66 on the rear surface of the bracket structure 64. Such an adhesive tape 66 is commercially available as Acrylic Foam Tape 5356 available from 3M Corporation, St. Paul, Minn.

Figure 2:
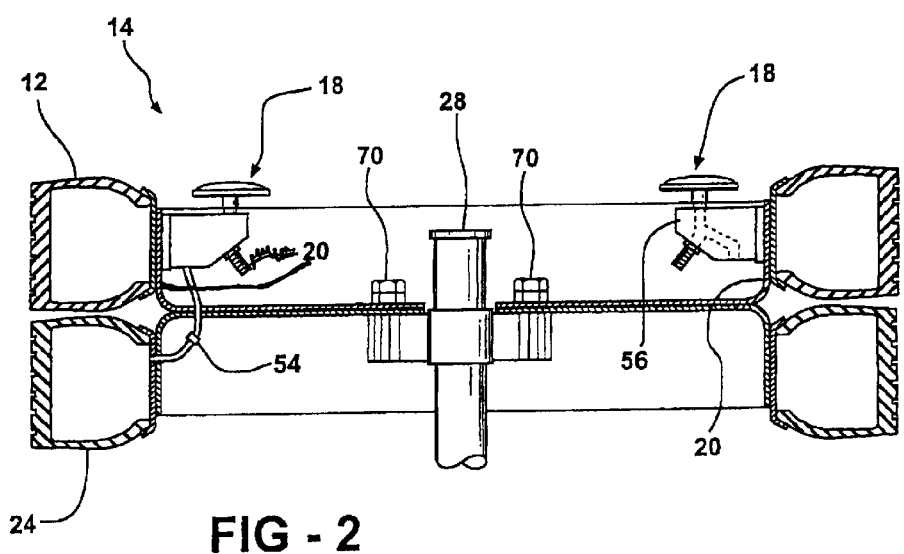
FIG. 2 is a side view of the tire pressure maintenance system and dual-wheel tire assembly of FIG. 1.

Thus, as can be seen from the foregoing, the invention provides a new system for gauging and filling the tires on vehicles or trailers. While adaptable for most all tire wheels, single or dual, it is particularly useful with dual deep-dish wheels as commonly used on trucks and tractor-trailer rigs. Dual wheel assemblies are basically two single such wheels that are bolted together back to back, as shown in FIG. 2. The described air-fill, gauging system of the invention provides readily accessible tire fill valve stems for filling or lowering the air pressure in respective tires and preferably a tire pressure gauge for each tire. An advantage of the invention is that can be easily mounted to the inside surface of the outside wheel without the need for mounting the air pressure system to the hub cap or similar structure of the wheel assembly, as in conventional air pressure gauging systems.

While the invention has been specifically described in connection with certain specific embodiments thereof, it is to be understood that this is by way of illustration and not of limitation, and the scope of the appended claims should be construed as broadly as the prior art will permit.

What is claimed is:

1. An air pressure measuring system for measuring the pressure of pneumatic tires, comprising:
    a bracket structure mounted to a rim of a wheel assembly and extending inwardly from the rim of the wheel assembly toward a hub of the wheel assembly such that the bracket structure dose not protrude from the wheel assembly;
    at least one air pressure gauge mounted to the bracket structure distal from the rim of the wheel assembly such that the at least one air pressure gauge does not protrude from the wheel assembly; and
    a pneumatic conduit being in communication with the at least air pressure gauge and a valve stem of a pneumatic tire,
    wherein the at least one air pressure gauge provides an indication of air pressure of the pneumatic tire to an operator.

2. The system according to claim 1, wherein the bracket structure is mounted to the rim of the wheel assembly by using adhesive rape.

3. The system according to claim 1, further including a strip of reflective material attached to an outer surface of the wheel assembly.

4. The system according to claim 3, wherein the reflective material comprises a plurality of micro-prism retroreflective elements.

5. The system according to claim 1, wherein the at least one air pressure gauge comprises a Bourdon tube type pressure gauge.

6. The system according to claim 1, wherein the at least one air pressure gauge includes a visual indication of the indication of air pressure of the pneumatic tire.

7. The system according to claim 1, wherein the at least one air pressure gauge includes a pair of stop posts.

8. An air pressure measuring system for measuring the pressure of pneumatic tires, comprising:
    a mounting assembly mounted to a rim of a wheel assembly and extending inwardly from the rim of the wheel assembly toward a hub of the wheel assembly such that the mounting assembly does not protrude from the wheel assembly;
    at least one air pressure gauge mounted to the mounting assembly distal from the rim of the wheel assembly such that the at least one air pressure gauge does not protrude from the wheel assembly; and
    a pneumatic conduit being in communication with the at least air pressure gauge and a valve stem of a pneumatic tire,
    wherein the at least one air pressure gauge provides an indication of air pressure of the pneumatic tire to an operator.

9. The system according to claim 8, wherein the mounting assembly is mounted to the rim of the wheel assembly by using adhesive tape.

10. The system according to claim 8, further including a strip of reflective material attached to an outer surface of the wheel assembly.

11. The system according to claim 10, wherein the reflective material comprises a plurality of micro-prism retroreflective elements.

12. The system according to claim 8, wherein the at least one air pressure gauge comprises a Bourdon tube type pressure gauge.

13. The system according to claim 8, wherein the at least one air pressure gauge includes a visual indication of the indication of air pressure of the pneumatic tire.

14. The system according to claim 8, wherein the at least one air pressure gauge includes a pair of stop posts.

15. A method for measuring the pressure of pneumatic tires using an air pressure monitoring system, comprising:

mounting a bracket structure to a rim of a wheel assembly and extending inwardly from the rim of the wheel assembly toward a hub of the wheel assembly such that the bracket structure does not protrude from the wheel assembly;

mounting at least one air pressure gauge to the bracket structure distal from the rim of the wheel assembly such that the at least one air pressure gauge does not protrude from the wheel assembly, wherein a pneumatic conduit is in communication with the at least air pressure gauge and a valve stem of a pneumatic tire, whereby the at least one air pressure gauge provides an indication of air pressure of the pneumatic tire to an operator.

* * * * *

UNITED STATES PATENT AND TRADEMARK OFFICE
CERTIFICATE OF CORRECTION

PATENT NO. : 6,782,740 B2
DATED : August 31, 2004
INVENTOR(S) : Mark K. Wallach

It is certified that error appears in the above-identified patent and that said Letters Patent is hereby corrected as shown below:

<u>Column 6,</u>
Line 33, please delete "rape" and insert -- tape --.

Signed and Sealed this

Seventh Day of December, 2004

JON W. DUDAS
*Director of the United States Patent and Trademark Office*